US007206674B1

(12) United States Patent
Statler et al.

(10) Patent No.: US 7,206,674 B1
(45) Date of Patent: Apr. 17, 2007

(54) INFORMATION DISPLAY SYSTEM FOR ATYPICAL FLIGHT PHASE

(75) Inventors: Irving C. Statler, Mountain View, CA (US); Thomas A. Ferryman, Richland, WA (US); Brett G. Amidan, Kennewick, WA (US); Paul D. Whitney, Richland, WA (US); Amanda M. White, Kennewick, WA (US); Alan R. Willse, Richland, WA (US); Scott K. Cooley, Kennewick, WA (US); Joseph Griffith Jay, Corvallis, OR (US); Robert E. Lawrence, Los Altos, CA (US); Chris J. Mosbrucker, Corvallis, OR (US); Loren J. Rosenthal, Los Gatos, CA (US); Robert E. Lynch, San Carlos, CA (US); Thomas R. Chidester, Mountain View, CA (US); Gary L. Prothero, Corvallis, OR (US); Adi Andrei, Corvallis, OR (US); Timothy P. Romanowski, Corvallis, OR (US); Daniel E. Robin, Philomath, OR (US); Jason W. Prothero, Corvallis, OR (US)

(73) Assignee: United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 0 days.

(21) Appl. No.: 10/923,156

(22) Filed: Aug. 13, 2004

Related U.S. Application Data

(63) Continuation-in-part of application No. 10/857,376, filed on May 21, 2004, now Pat. No. 6,937,924.

(51) Int. Cl.
*G06G 7/72* (2006.01)
*G06F 7/38* (2006.01)

(52) U.S. Cl. .......................... 701/14; 701/35; 244/184

(58) Field of Classification Search .................. 701/14, 701/29, 13, 15, 16, 35, 214, 207; 244/184, 244/203, 158 R, 75 R
See application file for complete search history.

(56) References Cited

U.S. PATENT DOCUMENTS

| | | | | |
|---|---|---|---|---|
| 4,235,104 | A | 11/1980 | Hoadley et al. | 73/180 |
| 4,729,102 | A * | 3/1988 | Miller et al. | 701/14 |
| 5,796,612 | A | 8/1998 | Palmer | 701/4 |
| 5,991,691 | A | 11/1999 | Johnson | 701/214 |
| 6,389,333 | B1 | 5/2002 | Hansman et al. | 701/3 |
| 6,449,573 | B1 | 9/2002 | Amos | 702/98 |
| 6,480,770 | B1 * | 11/2002 | Wischmeyer | 701/29 |

* cited by examiner

*Primary Examiner*—Dalena Tran
(74) *Attorney, Agent, or Firm*—John F. Schipper; Robert M. Padilla

(57) ABSTRACT

Method and system for displaying information on one or more aircraft flights, where at least one flight is determined to have at least one atypical flight phase according to specified criteria. A flight parameter trace for an atypical phase is displayed and compared graphically with a group of traces, for the corresponding flight phase and corresponding flight parameter, for flights that do not manifest atypicality in that phase.

12 Claims, 13 Drawing Sheets

Linked weather information

- Recorded at: -65
- Airport:
- Visibility:10 (mi),Temperature:18 (c),Dewpoint:0(c),Wind Direction:290 (deg),Wind Speed:13 (kts),Altimeter:2996 (in).Sky Condition:CLR ATIS Message:TWO NINER NINER SIX. VISUAL APCH TO, RWY 31R, RWY 35C, RWY 35R, RWY 36L. ACFT LNG RWY 36L CAN EXP TO HOLD SHORT OF TWY Z,10,650 FT AVAIL, ACFT LDG RWY 35C CAN EXP TO HOLD SHORT OF TWY EJ, 9050 FT AVAIL.. NOTAMS... KEEP XPNDR ON WHILE ON TWYS. Bird Activity VCNTY ARPT. READBACK RWY HOLD SHORT Instructions. ...ADVS you have INFO O.. .

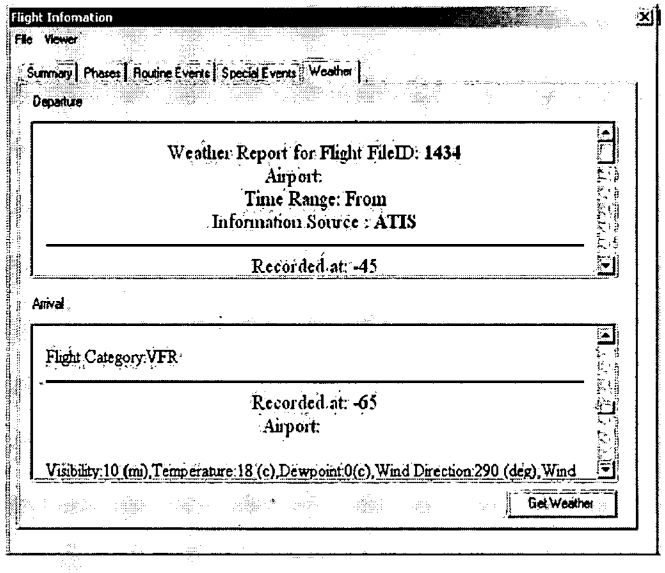

Fig. 11

INFORMATION DISPLAY SYSTEM FOR ATYPICAL FLIGHT PHASE

CROSS REFERENCE TO RELATED APPLICATIONS

This application is a Continuation in Part of prior application Ser. No. 10/857,376. U.S. Pat. No. 6,937,924, filed May 21, 2004, issued Aug. 30, 2005.

ORIGIN OF THE INVENTION

The invention described herein was made by employees of the United States Government and its contractors under Contract No. NAS2-99091 and may be manufactured and used by or for the Government for governmental purposes without the payment of any royalties thereon or therefor.

TECHNICAL FIELD

This invention relates to digital flight data processing that have been recorded on aircraft during flight operations.

BACKGROUND OF THE INVENTION

On a typical day, as many as 25,000 aircraft flights occur within the United States, and several times that number occur throughout the world. Most of these flights are safe. A few might exhibit safety issues. Many aircraft are equipped with instrumentation that collects from a few dozen parameters to a few thousand parameters every second for the full duration of the flight. These types of data have long been used for crash investigations, but can also be used for routine monitoring of flight operations. The subject invention relates to the latter activity. This provides an opportunity to analyze this data to identify portions of flights that exhibit safety issues. Aviation experts review these flights and recommend appropriate actions as a result.

Flight data, recorded during aircraft flight, consist of a series of parameter values. Each parameter describes a particular aspect of flight. Some parameters relate to continuous data such as altitude and airspeed. Other parameters assume a relatively small number of discrete values (e.g., two or three), such as thrust reverser position, flight guidance or autopilot command mode. Parameter measurements are usually made once per second although they may be recorded more or less frequently. Hundreds or even thousands of parameters may be collected for each second of an entire flight. These data are recorded for thousands of flights. The resulting data for an even modest size set of flights are voluminous.

These types of data have long been used for crash investigations but can also be used for routine monitoring of flight operations. The subject invention relates to the latter activity. The features of interest in routinely monitored flight data include specified exceedences (excessive speed, g-forces, and other characteristics that differ from standard operating procedures), unusual events, and statistical patterns and/or trends.

Digital flight data are passed through a series of processing steps to convert the massive quantities of raw data, collected during routine flight operations, into useful information such as that described above. The raw data are progressively reduced using both deterministic and statistical methods. In the final stages of processing, statistical methods are used to identify flights to be reviewed by aviation experts, who infer key safety and operational information about the flights described in the data. These flight data processing methods are imbedded in software.

Conventional methods of finding anomalous flights in bodies of digital flight data require users to pre-define the operational patterns that constitute unwanted performances. This can be a hit-or-miss process, requiring the experience and knowledge of experts in aviation operations, and it only identifies occurrences that specifically match the pre-defined condition. A conventional flight data analysis tool will find the patterns it is told to look for in flight data, but the tool is blind to newly emergent patterns for which the tool has not been programmed to look. The invention overcomes this deficiency because it does not require any pre-specification of what to look for in bodies of flight data.

Most flights are typical and exhibit no safety issues. A very few flights stand out as atypical based values displayed by the data. These flights may be atypical due to one flight parameter being very unusual or multiple parameters being moderately unusual. It turns out that these unusual flights often exhibit safety issues and thus are of interest to identify and refer to aviation safety experts for review. Additionally, these atypical flights might display safety issues in a manner never envisioned by safety experts; hence impossible to find using pre-defined exceedences as done by the current state of the practice.

What is needed is a system for identifying and displaying results for atypical phases of aircraft flights that provides individual and collective information on the flight phases that are determined to be atypical according to one or more criteria. Preferably, the display system should allow graphic and tabular display and comparison of relevant details that contribute to a specified phase atypicality and collective phase information for which atypical behavior occurs.

SUMMARY OF THE INVENTION

These needs are met by the invention, which displays quantitative collective information and information on individual aircraft flights that have been determined to be "atypical," according to one or more specified criteria disclosed in a co-pending patent application, "Identification of Atypical Flight Patterns," (U.S. Ser. No. 10/857,376, sometimes referred to as "IATP" herein) which is incorporated by reference herein. Conditions that contributed to one or more atypical phases for each specified flight are displayed in graphical and tabular format, and additional information is optionally displayed on relevant details that may have contributed to atypicality.

The IATP analysis allows identification of the most important flight parameters, capture and characterization of the dynamic values of these important parameters, and application of a consistent analysis to identify aircraft flights that exhibit atypical characteristics. This could mean that one or more of these parameters exhibits atypical values with respect to a collection of a set of flights that collectively define "typical". This could also mean that individual parameters were marginally atypical, but collectively atypical. The analysis must extend to a larger or smaller number of "important" parameters and should not depend upon choice of a fixed number of such parameters. The analysis allows identification of the most important flight parameters, capture and characterization of the dynamic values of these important parameters, and application of a consistent analysis to identify aircraft flights in which one or more of these parameters exhibits atypical values, without limiting the nature of the atypicalities to envisionable or pre-defined conditions. The analysis is extendable to a larger or smaller number of "important" parameters and should not depend upon choice of a fixed number of such parameters. This analysis, in order to be useful, should provide the resulting information in textual and graphical formats for review by a user.

The IATP analysis provides an approach: (1) to provide a set of time varying flight parameters that are "relevant;" (2) to transform this set of flight parameters into a minimal orthogonal set of transformed flight parameters; (3) to analyze values of each of these transformed flight parameters within a time interval associated with the flight phase; (4) to apply these analyses to the data for each aircraft flight; and (5) to identify flights in which the multivariate nature of these transformed flight parameters is atypical, according to a consistently applied procedure.

The IATP always begins with a selected subset of relevant flight parameters, each of which is believed to potentially characterize the nature of a selected aircraft's flight (q), for a selected phase (ph) of the flight (e.g., pre-takeoff taxi, pre-takeoff position, takeoff, low altitude ascent, high altitude ascent, cruise, high altitude descent, low altitude descent, runway approach, touchdown and post-touchdown taxi). Application of this criterion often reduces the number of flight parameters from a few thousand to a number as low as about 100, or lower if desired, referred to herein as underlying flight parameters ("FPs"). The data value for each record and for each FP is inspected to determine if the data are reasonable and should be used to characterize the nature of the aircraft's flight or if it is "bad" data that has been corrupted. If the data value is deemed "bad" that value is removed from the analysis process for those records where it is deemed "bad".

The (remaining) sequence of received FP values is analyzed separately for parameters that are interval ratio continuous numbers and for parameters that are ordinal or categorical parameters, sometimes referred to as discrete value parameters. A continuous value parameter value is approximated in each of a sequence of overlapping time intervals as a polynomial (e.g., quadratic or cubic), plus an error term. Each of the sequence of approximation coefficients for the sequence of time intervals is characterized by a first order statistic, a second order statistic, a minimum value and a maximum value, and, optionally, by at least one of a beginning value and an ending value for the sequence. The discrete value parameters are analyzed and characterized in terms of proportion of time at each discrete value and number of transitions between discrete values. The continuous value and discrete value characterization parameters are combined as an M×1 vector E for each flight. The set of flights is combined to form a matrix for which a covariance matrix F is computed.

An eigenvalue equation, $FV(\lambda)=\lambda V(\lambda)$, is solved. The data matrix formed by combining the M×1 vectors E for the set of flights is transformed by a data matrix to form a new matrix G. The set of all eigenvalues can be, and preferably will be, replaced by a reduced set of eigenvalues having the largest values.

A cluster analysis is performed on the new matrix G, with each flight being assigned to one of the clusters. The Mahalanobis distance for the flight with respect to the mean of all the flights (based on the G matrix) forms an estimate of the atypicality score for each flight, (q), in each phase, (ph). This atypicality score for flight (q) and phase (ph) is combined with the proportion of flights in the cluster flight q/phase ph was associated to calculate a new atypicality value, referred to as a Global Atypicality Score (GAS).

The Global Atypicality Scores for all the flights are ranked in decreasing order. The flights in the top portion (typically 5%) are labeled "atypical" ("Level 2" and "Level 3") and the most atypical of these flights are identified as "Level 3". These flights are brought to the user's attention in a list. The user can select any of these flights and drill down to get additional information about the flight, including comparison of its parameter values to the values of other flights. These procedures are part of the IATP analysis.

The display system receives the results of intermediate and completed calculations and displays, in alphanumeric format and/or graphically, several quantities, such as: number of level 1, level 2 and level 3 atypical phase flights; specific flight attributes that contributed to the phase atypicality, including (optionally) identification of the flight and aircraft; comparison of a time varying trace of an atypical-phase flight with traces for a collection of similar but non-atypical-phase flights; and aircraft corrective actions, if any, taken in response to the observed phase atypicality.

BRIEF DESCRIPTION OF THE DRAWINGS

FIG. 11 illustrates a report of relevant weather data that can be displayed for a specified airport, date and time.

DESCRIPTION OF BEST MODES OF THE INVENTION

Figure 1:
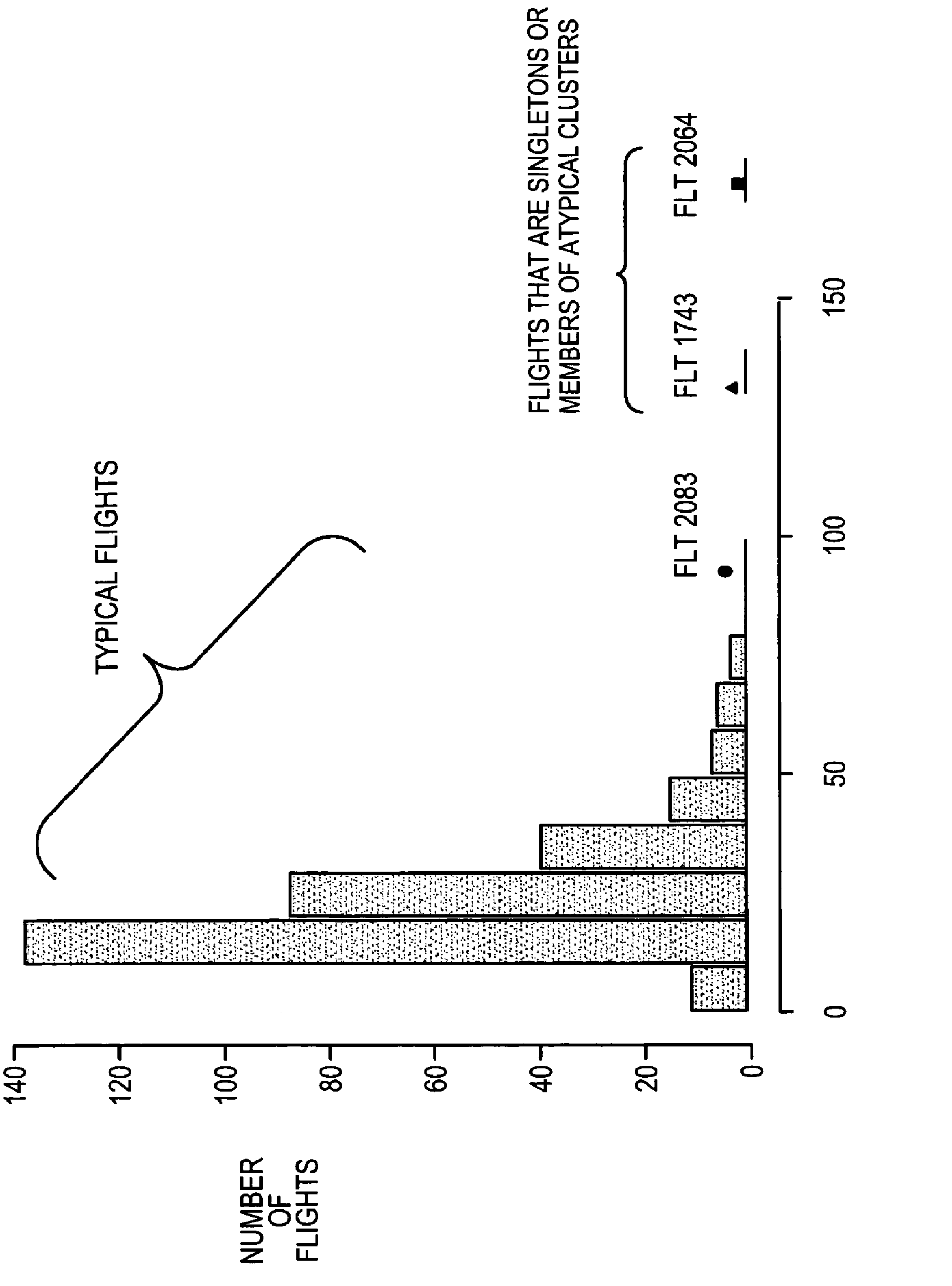
FIG. 1 is a histogram of a representative group of flights, illustrating the appearance of two statistical outliers for fictitious flights.

In the IATP analysis, a sequence of values for each of a selected set of P relevant flight parameters FP is received, and unacceptable values are removed according to one or more of the following: (1) each value $u_n$ of a sequence is compared with a range of acceptable values, $U1 \leqq u \leqq U2$, and if the parameter value $u_n$ lies outside this range, this value is removed from the received sequence; and (2) a first difference of two consecutive values, $u_{n-1}$ and $u_n$, is compared with a range of acceptable first differences, $\Delta_1 U1 \leqq u_n - u_{n-1} \leqq \Delta_1 U2$, and if the computed first difference lies outside this range, at least one of the values, $u_{n-1}$ and $u_n$, is removed from the received sequence.

For continuous value parameters, each such parameter is analyzed by applying a time-based function over each of a sequence of partly overlapping time intervals $(t_{n0}, t_{n0+N-1})$ of substantially constant temporal length (N values) to develop, for each such time interval and for each FP, a polynomial approximation in a time variable t (e.g., quadratic or cubic), plus an error coefficient. For example, the polynomial may be a quadratic sum, such as $$p(n0\backslash t;app)\approx p_0(n0)+p_1(n0)\cdot(t-t_{n0})+p_2(n0)\cdot(t-t_{n0})^2+e(n0) \quad (1A)$$

$$d(n0)=(N-3)^{-1}\sum_{n=n0}^{N+n0-1} e(n)^2, \quad (1B)$$

including an error coefficient e(n0) that (i) is minimized for each time interval, $t_{n0} \leqq t \leqq t_{n0+N-1}$, by appropriate choice of the coefficients $p_0$, $p_1$ and $p_2$ and (ii) reflects how closely the actual FP data are approximated by the corresponding time dependent polynomial for the corresponding time interval.

For the sequence of time intervals in the selected phase for the selected FP, each of the sequence of coefficients $\{p_0(n0)\}_{n0}$, $\{p_1(n0)\}_{n0}$, $\{p_2(n0)\}_{n0}$ and $\{d(n0)\}_{n0}$, considered as a vector v of entries, is represented by characterization parameters, which include a first order statistic m1(v) (e.g., weighted mean, weighted median, mode), by a second order statistic m2(v) (e.g., standard deviation), by a minimum value min(v), by a maximum value max(v), and optionally by a beginning value begin(v) and/or by an ending value end(v) for that coefficient sequence. The collection of these characterization parameters is formatted and stored as an M×1 vector E1, representing the collection of time intervals for that phase (ph) for that flight parameter for that flight (q).

Each ordinal or categorical parameter (sometimes referred to as a discrete-valued parameter), numbered k2=1, . . . , K2 and having L(k2) discrete states, is analyzed by forming a square transition matrix, with each row and each column representing each of the possible states or values of the parameter(s). Each data point from the full flight phase is processed by counting the number of transitions $N_{i,i+1}$ from a state $S_i$ on record i to an immediately subsequent state $S_{i+1}$ on record i+1, including the number of transitions of a state to itself. Each diagonal entry in this transition matrix is divided by the sum of the original diagonal values, to convert the matrix to an $L(k2)^2 \times 1$ vector $E\mathbf{2}_{k2}$, where L(k2) is the number of distinct values for this parameter, k2. The set of vectors $E\mathbf{2}_{k2}$ for all the discrete parameters of the phase for this flight are concatenated into a vector E2, that is L×1, where L is the sum of $L(k2)^2$ over all k2=1, . . . , K2.

The discrete parameter vector(s) for each phase and for the phase ph is/are combined with the $M_1 \times 1$ vector E1 for continuous value parameters to form an M×1 row vector E ($M=M_1+L$) that includes the contributions of continuous and discrete value parameters. The E vectors from each of the Q flights in the set selected to be studied are combined to form a matrix, denoted as DM. Optionally, vectors E for adjacent phases can be combined to perform a multiple phase analysis, if desired.

An M×M covariance matrix $$F=\mathrm{cov}(E) \quad (2)$$

is formed, which is symmetric and non-negative definite, and an eigenvalue equation $$F\cdot V(\lambda)=\lambda V(\lambda) \quad (3)$$

is solved to determine a sequence of $M=M_1+L$ eigenvalues $\lambda_i$ with $\lambda_1 \geqq \lambda_2 \geqq \ldots, \lambda_M \geqq 0$. The eigenvalue equation (3) can be solved in a straightforward manner, or a singular value decomposition (SVD) approach can be used, as described by Kennedy and Gentle in *Statistical Computing*, Marcel Dekker, Inc., 1980 pp 278–286, or in any other suitable numerical analysis treatment. (The method used is equivalent to what is known as principle component analysis.) One works with a selected subset $\{\lambda'_i\}$ of these eigenvalues, which may be a proper subset of M' eigenvalues (M'<M), where $$\sum_{i=1}^{M'} \lambda'_i \geq f\cdot\sum_{i=1}^{M} \lambda_i, \quad (4)$$

and f is a selected fraction satisfying $0<f\leqq 1$ for example, f=0.8 or 0.9.

A transformed matrix $$G=DM\cdot F \quad (5)$$

is then computed. Preferably, the matrix G is normalized by subtraction of a first order statistic of each column and by division of the difference by a second order statistic associated with that column.

An atypicality score, also referred to as a Mahalanobis distance, $$A_q=(1/(M'-3))\sum_{j=1}^{M'} (G'_{qj})^2/\lambda'_j \quad (6)$$

is computed for each flight (q) and each phase (ph).

The atypicality scores for the selected set of flights can be compared using a histogram of reference atypicality scores for a collection of reference flights. An atypical flight will often appear as a statistical outlier, as illustrated in FIG. 1 for two fictitious flights "2064" and "1743". This one dimensional approach has the advantage of simplicity of interpretation.

A p-value, corresponding to an atypicality score $A_q$, the selected flight q and the selected phase ph, is defined using the Wishart probability density distribution as defined in Anderson, *An Introduction to Multivariate Statistical Analysis, 2nd Edition,* John Wiley & Sons, 1984, pg 244–255.

$$p(q;ph)=(F1\cdot F2)/(F3\cdot F4\cdot F5) \quad (7A)$$

where $$F1=|A_q|^{(R-M-1)}, \quad (7B)$$

$$F2=\exp(-(1/2)\mathrm{trace}(\Sigma^{-1}A_q)), \quad (7C)$$

$$F3=2^{-MR}*\pi^{M(M-1)/4}, \quad (7D)$$

$$F4=|\Sigma|^{1/2R}, \quad (7E)$$

$$F5=\Pi^{M}_{i=1}\Gamma((1/2)(R+1-i)), \quad (7F)$$

Γ(x) is an incomplete gamma function.

A cluster analysis is applied to a collection of observed values G (from Eq. (5)) for the same phase and for the full set of selected flight(s). A preferred cluster analysis is K-means analysis, as set forth in any of a number of statistics and data mining books, including Kennedy, Lee, Roy, Reed and Lippman, *Solving Data Mining Problems Through Pat-*

*tern Recognition*, Prentice Hall PTR, 1995–1997, page 10–50 through 10–53. The clustering is performed for each phase (or aggregated group of phases) separately.

The initialization step requires selection of the number K of clusters, and the setting of the initial seed values. There are a number of ways to set these seeds; including using (i) a random selection of K flight vectors U from the full set of flight vectors, (ii) a random selection of dimension values for each of the K flight vectors, (iii) setting the seeds to be all zeros in all dimension but one and that value is a maximum or minimum of that value among all flight vectors. There are many other ways as well. The first method is a preferred method. These seeds take the role as the initial values of the cluster centers or centroids.

The next step requires that the distance from each cluster centroid to each flight vector is calculated. A flight vector is associated with the cluster that has the minimum flight vector-to-center distance. There are numerous methods to calculate distance, including Euclidian distance, Manhattan distance and cosine methods. A preferred distance is the Euclidean distance.

After associating every flight vector U with a cluster, the centroid for each cluster k is calculated as the mean or first order statistic in each dimension of the flight vectors that are associated with cluster k.

These last two steps are repeated until the number of flight vectors changing cluster membership is below some threshold, or until an upper limit of number of iterations is reached.

A second preferred cluster analysis method is hierarchical clustering, which works with partitions of the collection of observations that are built up (agglomerations) or that are divided more finely (divisions) at each stage. Hierarchical methods are discussed by B. S. Everitt, *Cluster Analysis*, Halsted Press, New York, Third Ed., 1993, pp. 55–89. Other cluster analysis can also be performed using any of the approaches set forth in B. S. Everitt, ibid, pp 37–140.

Hierarchical clustering initially assigns each flight, q=1, . . . , Q, to its own cluster, c=1, . . . C. Then the "distance" between all possible flight vectors pairs is calculated using the G matrix and identify the two flight vectors with the minimum distance. There are numerous methods to calculate distance, including Euclidian distance, Manhattan distance and cosine methods. A preferred method is the Euclidean distance. These flight vectors are associated with a cluster. The cluster's centroid is calculated based on all its members, denoted by cc, 1, . . . , CC.

After the first cluster is formed, calculate the distance between all possible pairs from Q-1 objects (Q-2 flight vectors and 1 cluster), find the pair with the minimum distance and assign them to a cluster. This may be a pair of flight vectors or a flight vector with a cluster (and if there are multiple clusters, as there inevitably will be, this could be two clusters jointed to form one larger cluster). Continue this process of calculating distances, finding the minimum distance and assigning flights or clusters to form bigger clusters until all have been aggregated to one global cluster.

Figure 2:
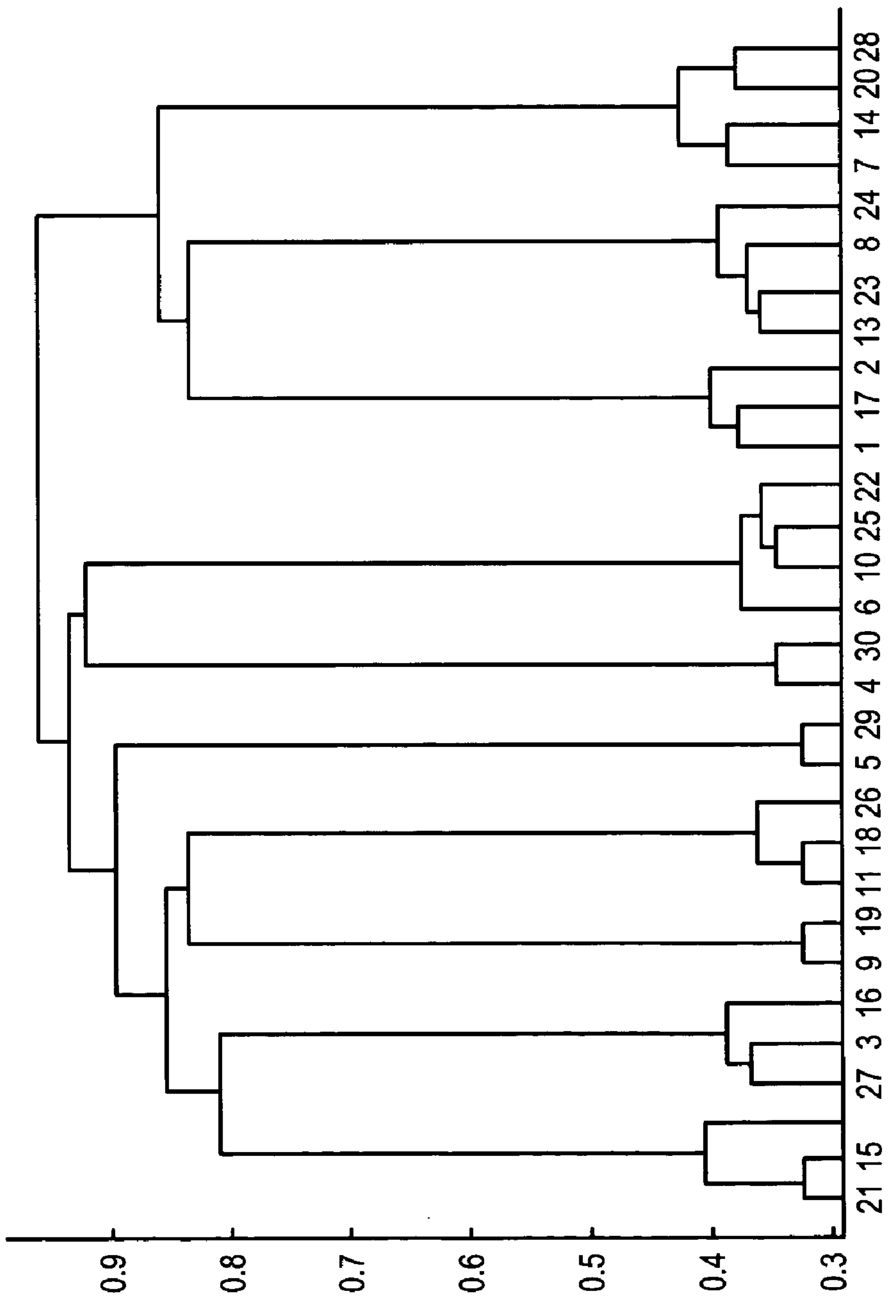
FIG. 2 illustrates a dendogram display of hierarchical clustering.

FIG. 2 illustrates this process graphically in a dendogram. The user has the option of how many clusters to use. One could choose any number from 2, . . . (Q-1). One could cut the dendogram horizontally to form K clusters or at different levels for different clusters. The options commonly used are: (1) to specify the number of clusters and cut horizontally, (2) to look for long vertical branches in the dendogram and cut horizontally at that level, (For FIG. 2 this would result in 10 clusters.), and (3) to calculate a index of cluster homogeneity as a function of the sum of the squares of within-cluster distances and between-cluster distances. A preferred method is the first. References to these and other acceptable techniques can be found in Webb, Andrew. *Statistical Pattern Recognition*. Oxford University Press Inc. New York, 1999. pp. 308–310. or G. W. Milligan and M. C. Cooper. "An examination of procedures for determining the number of clusters in a data set" Psychometrika, vol. 50(2):159–179, 1985.

A cluster membership score CMS(q;ph), equal to a monotonic function of a ratio, which is the number of observations in that cluster, divided by the total number of observations (0<CMS<1), is then computed for the selected flight (q) and the selected phase (ph). A larger value of CMS corresponds to a less atypical set of observed values for the selected flight (q) and the selected phase (ph), and inversely.

A Global Atypicality Score GAS for a selected flight (q) and selected phase (ph) is then defined as $$\mathrm{GAS}(q;ph)=-\log_z\{p(q;ph)\}-\log_z\{\mathrm{CMS}(q;ph)\}, \tag{8}$$

where z is a selected real number greater than 1. According to the definition in Eq. (8), a Global Atypicality Score GAS increases with decreasing p-values and with decreasing CMS values. A probability value Pr can be assigned to each GAS value that decreases with an increase in the GAS value. The logarithm functions in Eq. (8) can be replaced by another function Fn that is monotonic in the argument, such as $$\mathrm{GAS}(q;ph)=w1\cdot\mathrm{Fn}\{p(q;ph)\}+(1-w)\cdot\mathrm{Fn}\{\mathrm{CMS}(q;ph)\}, \tag{9}$$

where w is a number lying in the range $0 \leqq w \leqq 1$.

Figure 3A:
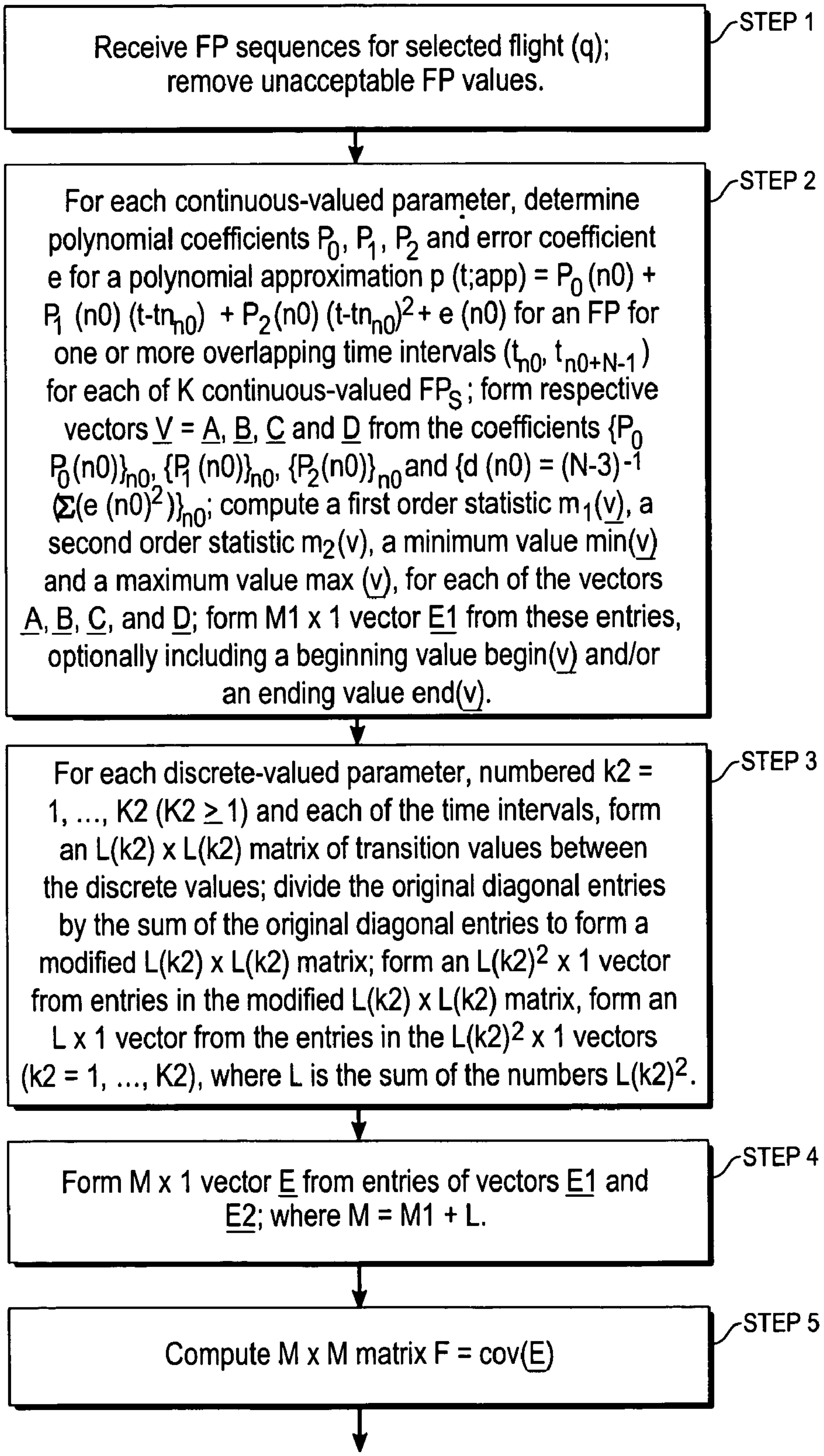
FIGS. 3A. 3B. 3C are a flow chart of a procedure for practicing an embodiment of the invention.
Figure 3B:
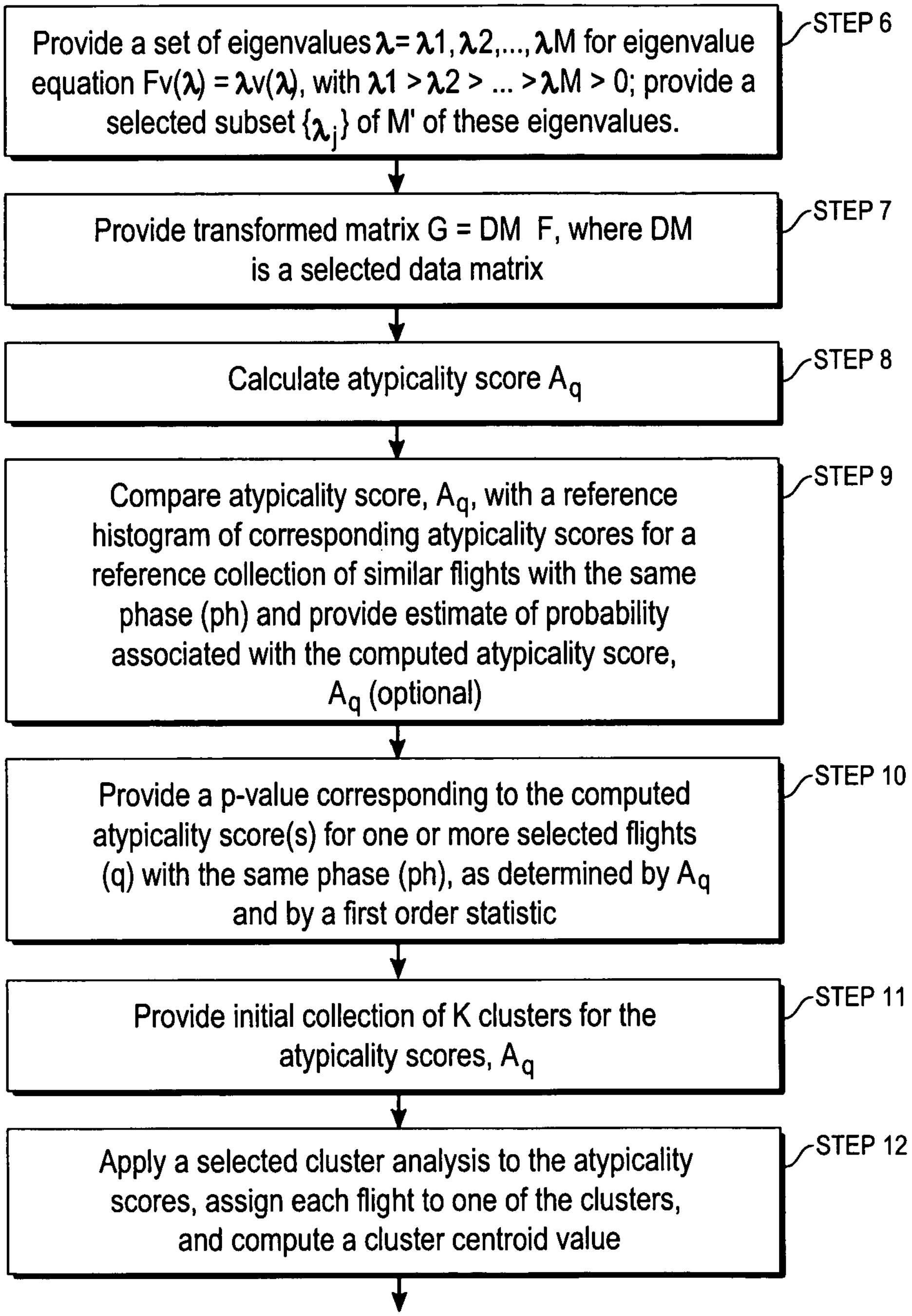
Figure 3C:
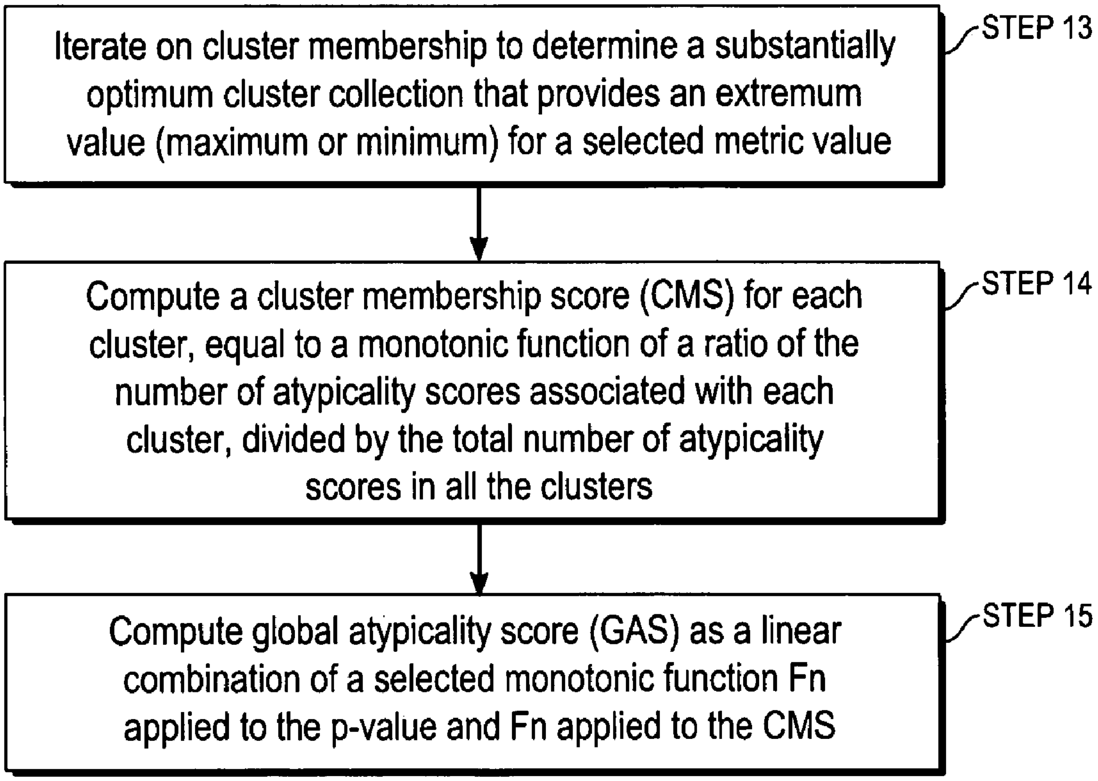

FIG. 3 is a flow chart of a procedure for practicing the invention. In step 1, one or more sequences of flight parameter (FP) values are received for a selected phase (ph) for a selected flight (q), for each of a sequence of overlapping time intervals, and unacceptable parameter values are identified and removed from one or more sequences.

In step 2, applicable to a parameter with continuous values, polynomial coefficients $p_0(n0)$, $p_1(n0)$ and $p_2(n0)$ and an error coefficient e(n0) are determined for a polynomial approximation $p(t;app)\approx p_0(n0)+p_1(n0)(t-t_n)+p_2(n0)(t-t_n)^2+e(n0)$, where the coefficients $p_0$, $p_1$ and $p_2$ are chosen to minimize the magnitude of e. The collections of coefficients $\{p_0(n0)\}n0$, $\{p_1(n0)\}_{n0}$, $\{P_2(n0)\}_{n0}$, and $(d(n0)=(N-3)^{-1}\Sigma e(n0)^2\}_n$ are treated as entries for the respective vectors v=A, B, C and D, for the selected flight (q) and the selected phase (ph). A first order statistic m1(v), a second order statistic M2(v), a minimum value min(v) and a maximum value max(v), and optionally at least one of a beginning value begin(v) and an ending value end(v), are computed for each of the vectors v=A, B, C and D. An M1×1 vector E1 is formed, including the entries of the vectors A, B, C and D.

In step 3, for each of the overlapping time intervals, an L(k2)×L(k2) matrix is formed whose entries are the number of transitions from one of L(k2) discrete values to another of these discrete values of an FP; each of the original diagonal values of the L(k2)×L(k2) matrix is divided by the sum of the original diagonal values so that the sum of the diagonal entries of this modified L(k2)×L(k2) matrix has the value 1. An L×1 vector E2 is formed from the entries of the modified L(k2)×L(k2) matrices, where L is the sum of the squares $L(k2)^2$.

In step 4, an M×1 vector E, including the entries of the vectors E1 and E2, is formed, where M=M1+L. In step 5, an M×M covariance matrix F=cov(E) is computed.

In step 6, eigenvalues k for an eigenvalue equation, FV(λ)=λV(λ), are obtained, where $\lambda 1 \geqq \lambda 2 \geqq \ldots \geqq \lambda M \geqq 0$, and a selected subset of these eigenvalues, $\lambda'1 \geqq \lambda'2 \geqq \ldots \geqq \lambda'M' \geqq 0$, is provided, where $M' \leqq M$.

In step 7, a transformed matrix G=DM·F is provided, where DM is a selected data matrix.

In step 8, an atypicality score, $A_q$ is calculated based on the M' variables for the selected set of flights and the selected phase (ph), as set forth in Eq. (6).

In step 9 (optional), the computed atypicality score, $A_q$, for the selected flight is compared with a reference histogram of corresponding atypicality scores for a reference collection of similar flights with the same phase (ph), and an estimate is provided of a probability associated with the computed atypicality score relative to the reference collection. Step 9 is a simplified alternative to cluster analysis, which is covered in steps 10–15.

In step 10, a p-value corresponding to the computed atypicality score is provided for the selected flight and/or for one or more similar flights with the same phase (ph), as determined by $A_q$.

In step 11, an initial collection of M'-dimensional clusters is provided for the atypicality scores, $A_q$.

In step 12, a selected cluster analysis, such as K-means analysis or hierarchical analysis, is performed for the cluster collection provided. Each atypicality score is assigned to one of the clusters, and a selected cluster metric value or index is computed.

In step 13, membership in the clusters is iterated upon to determine a substantially optimum cluster collection that provides an extremum value (minimum or maximum) for the selected cluster metric value or index.

In step 14, a cluster membership score (CMS) is computed for each cluster, equal to a monotonic function of a ratio, the number of observations (atypicality scores) associated with each cluster, divided by the total number of observations in all the clusters.

In step 15, a global atypicality score GAS is computed as a—a linear combination of a selected monotonic function Fn applied to the p-value and the selected function Fn applied to the CMS, for the selected flight(s) and the selected phase (ph).

Figure 4:
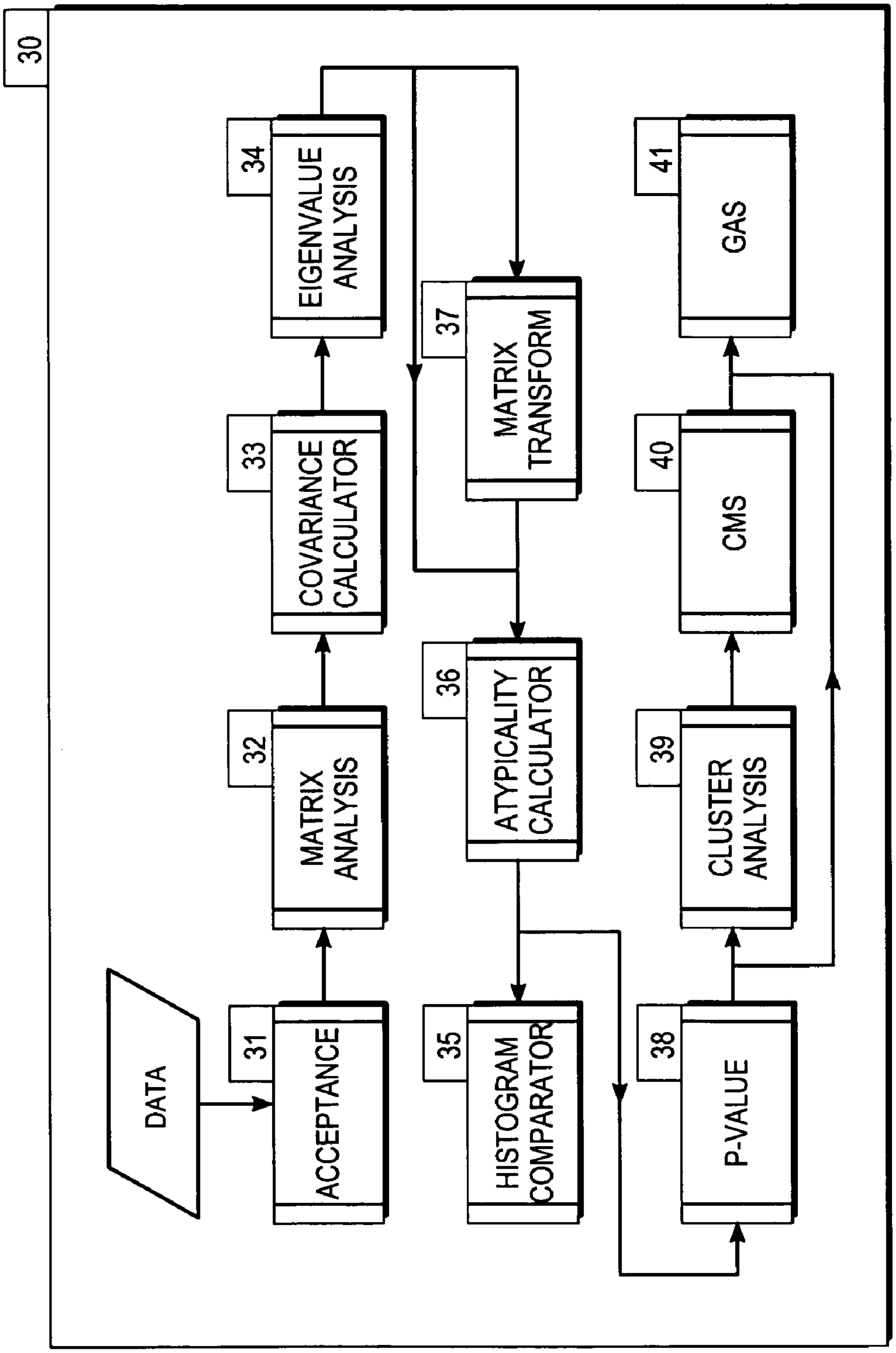
FIG. 4 is a schematic view of a system for practicing the invention.

FIG. 4 is a schematic view of a computer system 30 for practicing the invention. The sampled values (continuous and/or discrete) are received at an input terminal of an acceptance module 31 that performs step 1 (FIG. 3) and determines which sampled values are acceptable. The acceptable values are presented to a matrix analysis module 32, which (i) distinguishes between continuous and discrete parameter values and (ii) performs the polynomial approximation analysis and statistical analysis and (iii) forms the vectors E1, E2 and E, as in steps 2, 3 and 4. The vector E is received at a covariance calculation module 33, which generates and issues the matrix F=cov(E), as in step 5. The matrix F is received by an eigenvalue analyzer 34, which solves the eigenvalue equation, $FV(\lambda)=\lambda V(\lambda)$ and stores the eigenvalues $\lambda=\lambda 1, \ldots, \lambda M$, as in step 6. Optionally, the eigenvalue analyzer 34 identifies a selected subset of M' eigenvalues. A transformed matrix G=DM·F is formed in a matrix transformation module 35, as in step 7, where DM is a matrix of selected FP values. The eigenvalues $\lambda'i$ and the entries of the transformed matrix G are received by an atypicality calculator 36, which calculates an atypicality score or flight signature, as in step 8. The atypicality score is optionally analyzed by a histogram comparator module 37, as in step 9.

A collection of one or more atypicality scores is received by a p-value module 38, which calculates a p-value for the collection, as in step 10 (FIG. 3). A cluster analysis module 39 receives the G matrix and determines an optimal assignment of each flight vector to one of K clusters. A cluster membership score (CMS) is computed by a CMS module 40, as in step 14. A GAS module 41 receives the p-value score(s) and the CMS score(s) and computes a global atypicality score (GAS), as in step 15.

A GAS value for a selected flight (q) and selected phase(s) (ph) may be compared with a spectrum of GAS values for a collection of reference flights for the same phase(s) to estimate a probability associated with the GAS for the selected flight. A GAS value for a selected flight may, for example, be placed in the most atypical 1 percent of all flights, in the next 4 percent of all flights, in the next 16 percent of all flights, or in the more typical remaining 80 percent of all flights.

Assume that the selected flight atypicality score is assigned to a given cluster, SFC. The GAS value for that selected flight will decrease as the CMS for the cluster SFC increases, and inversely. An increased CMS value for the SFC corresponds to enlargement of the SFC. The logarithm function $-\log_z(x)$ manifests increased sensitivity to change of the argument x as x approaches 0.

One embodiment of the display system begins with relevant data for a large collection of flights (preferably at least 100) that, optionally, use a particular model of aircraft, where the flights were made in a specified time interval (e.g., a particular N-day interval) and identifies flights that fall into one of two or more levels of atypicality; for example, three levels, including the most atypical 1 percent, the next most atypical 4 percent and the next most atypical 15 percent of the original collection. Optionally, each atypical flight is identified by the atypicality attribute(s) and flight phase where the atypicality occurred and by one or more of (i) the tail number of the aircraft, (ii) the aircraft departure time, (iii) the departure airport, and (iv) the (original) aircraft destination airport. These data are illustrated for a group of 30 flights in a table in FIG. 6, where relevant data for a group of atypical phase flights are presented.

The level of flight atypicality may be determined, for example, by procedures disclosed in the IATP application, where a system (1) provides a set of time varying flight parameters that are "relevant;" (2) transforms this set of flight parameters into a minimal orthogonal set of transformed flight parameters; (3) analyzes values of each of these transformed flight parameters within a time interval associated with the flight phase; (4) applies these analyses to the data for each aircraft flight; and (5) identifies flights in which the multivariate nature of these transformed flight parameters is atypical, according to a consistently applied procedure.

Figure 5:
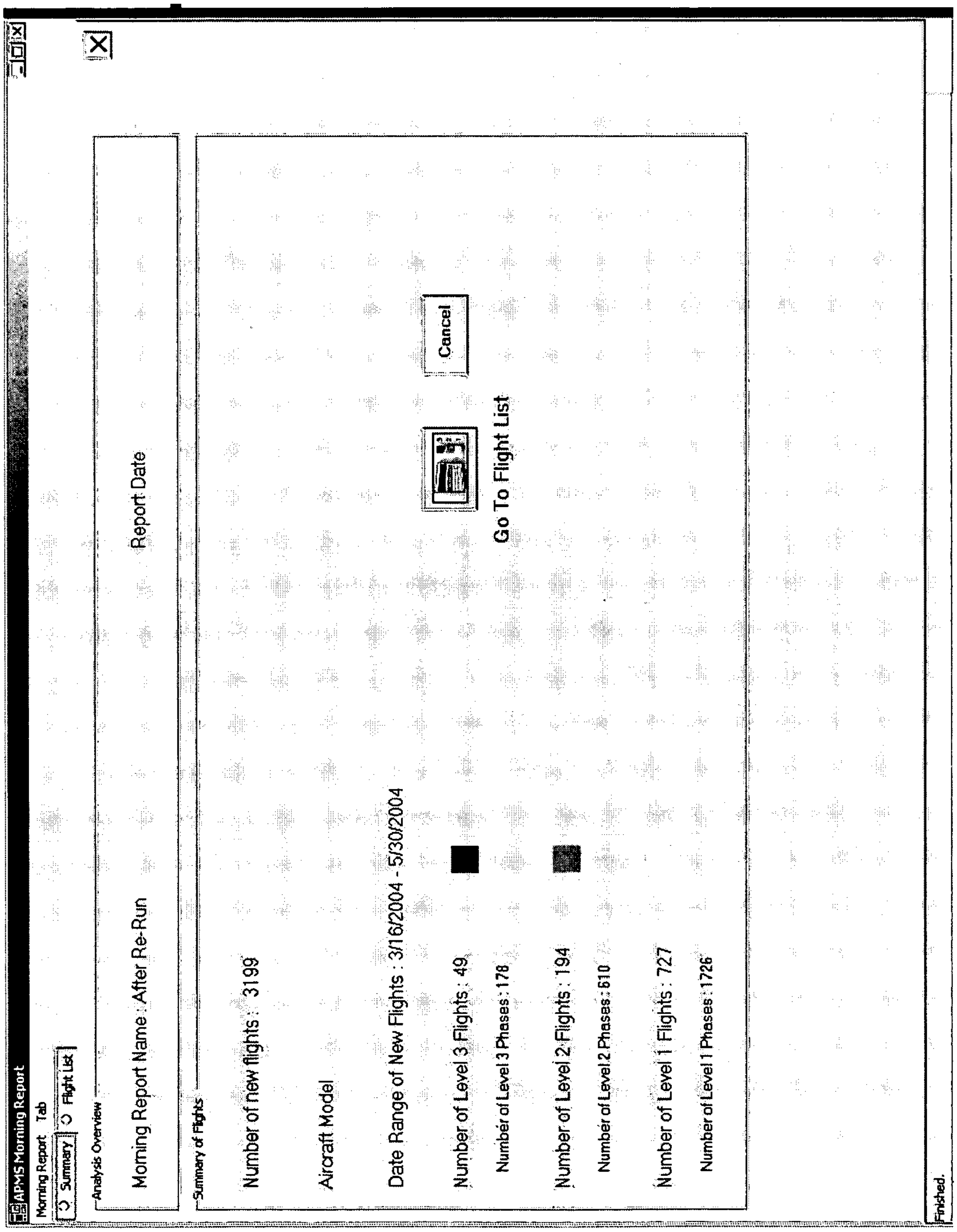
FIG. 5 illustrates useful collective information concerning level 3, level 2 and level 1 phase atypicalities for a collection of atypical phase flights.

FIG. 5 illustrates some of the phase atypicality numerical information provided by an IATP analysis, including (1) total number of flights analyzed, (2) aircraft model, (3) date range for the new flight(s), (4) number of flights that produced a level 3 atypicality, level 2 atypicality or level 1 atypicality, and (5) total number of phases involved in each of the level 3, level 2 and level 1 atypicalities. The user can move directly to the list of flights and view results of or interrogate (a) each of one or more flights separately, or (2) a specified group of such flights, including but not limited to all these flights.

Figure 6:
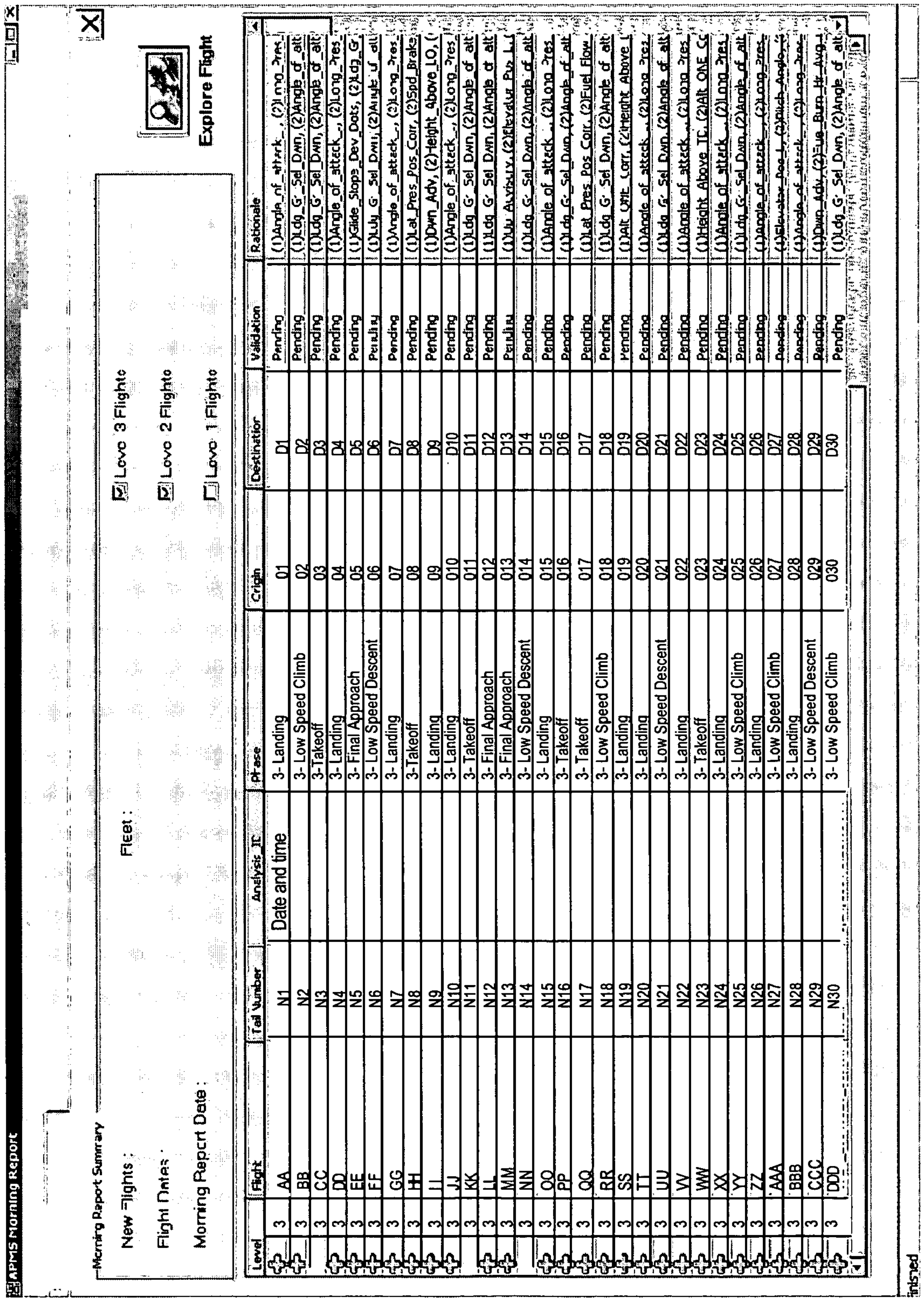
FIG. 6 illustrates, in tabular form, relevant data from a collection of atypical phase flights.

For the identified atypical phases of flights, a display shown in FIG. 6 identifies: the flight number and corresponding aircraft tail number; a flight date and time of aircraft departure for the atypical-phase flight; an origin airport; a destination airport; a flight phase (e.g., pre-takoff taxi, lift-off, low altitude ascent, high altitude ascent, cruise, high altitude descent, low altitude descent, landing approach, final approach, landing and post-landing taxi) during which the atypicality occurred; and the flight attribute(s) that contributed to identification of the flight phase as atypical. A flight may be identified as atypical, based upon quantitative contributions from one or more (usually several) flight attributes that are examined to identify presence of an atypical phase. Preferably, each flight phase is examined separately to determine if one or more attributes associated with that phase causes that phase to be atypical.

Figure 7:
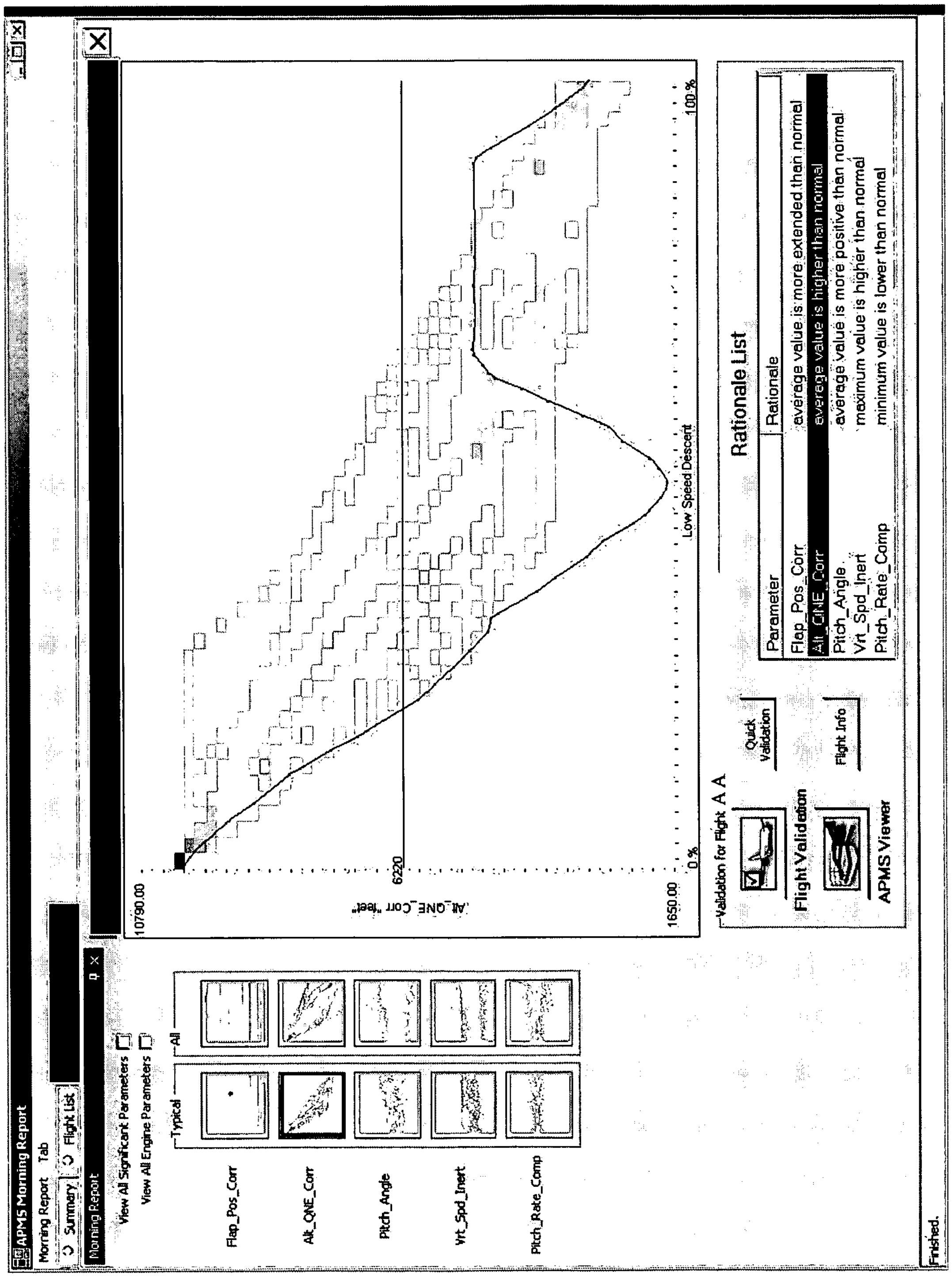
FIGS. 7 and 8 graphically illustrate several aircraft flight attributes that may have contributed to an exceedence or to an atypical phase (final approach) for a specified flight.
Figure 8:
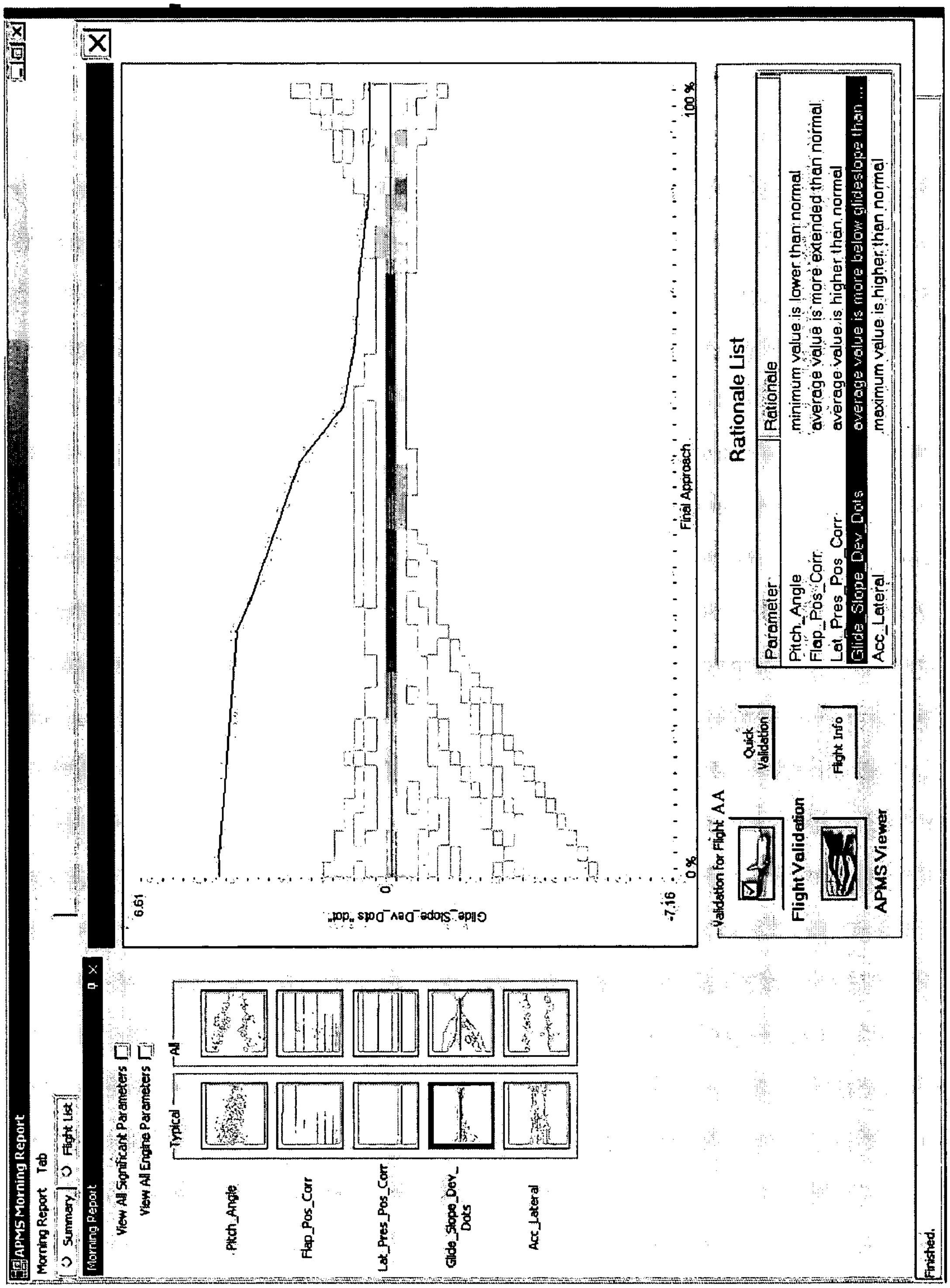

For example, in the table shown in FIG. 6, Flight A experienced a first atypical phase during low altitude ascent, arising from a non-normal Ground_Select_Down and an out-of-range Angle_Of_Attack, and experienced a second atypical phase during landing arising from an out-of-range Angle_Of_Attack and out-of-range longitudinal location. Traces of these atypical phase parameters can be presented as parameter traces, as illustrated in FIGS. 7 and 8, discussed below. In FIG. 6, each flight that has more than one atypical phase is identified by a symbol, such as "+" in the Level column.

Some operationally interesting attributes, or groups of attributes that contribute to atypicality include, but are not limited to:

takeoff anomalies,
non-normal aircraft ascent patterns,
TCAS RA with escape maneuver(s),
turbulence and aircraft accommodation,
high energy arrivals,
non-normal descent patterns, and
landing rollout anomalies, among others. The attribute groups that contribute most often to atypicality for a given group of flights are optionally identified and displayed in text format by the system, and the percentage of flights for which this attribute group causes or contributes to an atypical flight phase is optionally displayed.

Additional information on one or more of the atypicality attributes set forth above is available and is optionally displayed in one or more additional "screens." For example, a high energy arrival occurs when: (1) the arriving aircraft has an unusually high speed (above 200 knots) as the aircraft approaches 2500 feet altitude from above and/or (2) the aircraft has an above-standard glide path angle during low speed descent and final approach to landing. Any of at least three outcomes can result from a high energy arrival: (1) the aircraft is subsequently controlled and stabilized so that a normal approach and landing is subsequently executed (e.g., all parameters are within the desired envelope at and below 1000 feet altitude above touchdown altitude); (2) the aircraft pulls up and executes a go-around to approach the landing in a more stabilized configuration; and (3) the aircraft continues its landing approach in an unstable configuration. A high energy arrival has been identified through atypicality analysis in at most 1–2 percent of aircraft arrivals.

FIG. 7 is a parameter trace illustrating variation of measured air speed for a designated aircraft during final approach to landing, for which at least one approach parameter value manifests an exceedence and lies outside a band (gray region) determined by 80 percent of similar aircraft whose "typical" approach speeds have been measured. A list of possible flight parameter behaviors ("atypicality rationales"), including out-of-band average air speed, that may have contributed to this exceedence is set forth as part as part of the displayed information, and a (different) graph for each of these is brought up using a selection arrow as illustrated: (1) maximum air speed is higher than normal; (2) average air speed is higher than normal; (3) pitch angle (nose slope) is opposite to a normal pitch angle; (4) rudder angle is more positive than normal; and (5) flaps are extended more than normal (e.g., at 30, where 5 is normal). The approach of the illustrated flight would need to be studied in more detail to determine which, if any, of these rationales were operationally significant, contributing, causative, correlated or consequential.

However, a graph of a parameter value for each of these five rationales can be quickly displayed and viewed to determine which, if any, of the corresponding parameter values are likely contributors. Data recorded by a flight recorder during the flight, plus accumulated data for the "normal" band, are used to construct each of the graphs for the rationales.

FIG. 8 is a parameter trace illustrating variation of glide slope angle, for a designated flight and atypical flight phase (final approach) and for the 80 percent of the flights that are considered "typical." Each of the following flight parameter variables can be displayed for comparison: (1) aircraft wing pitch angle; (2) wing flap position (3) lateral pressure position; (5) glide slope deviation from normal (illustrated graphically in FIG. 4); and (5) lateral acceleration. In the example shown in FIG. 8, the glide slope angle deviations for the 80 percent of the most nearly normal approaching aircraft vary from about −5 "dots" to about +2 dots at the beginning of final approach and decrease monotonically as touchdown is approached; whereas for the atypical phase flight the glide slope angle deviation is about 4.5 dots and decreases more slowly as final touchdown is approached.

The approach of the designated flight would need to be studied in more detail to determine which, if any, of these rationales were operationally significant, contributing, causative, correlated or consequential.

However, a graph of a parameter value for each of five rationales can be quickly displayed and viewed to determine which, if any, of the corresponding parameter values are likely contributors. Data recorded by a flight recorder during the flight, plus collective data for the "normal" band, are used to construct each of the graphs for the rationales.

Figure 9:
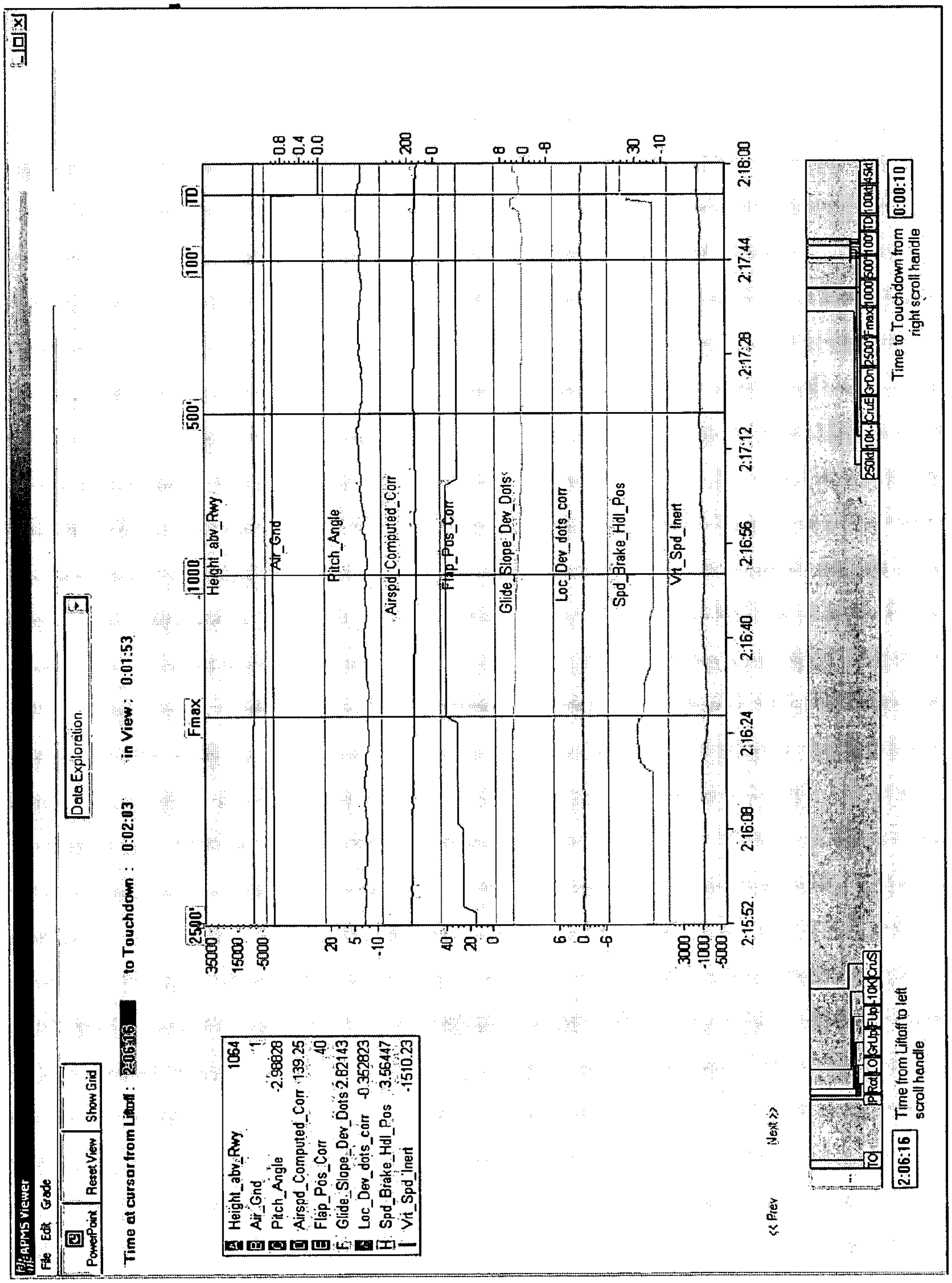
FIG. 9 illustrates nine parameter traces for selected flight parameters.

FIG. 9 graphically illustrates a parameter trace for N selected flight parameters (here, N=9) for a designated flight in a final approach phase: aircraft height above runway, air/ground switch (indicating wheels up (0) or wheels down (1) at a particular time), aircraft pitch angle, computed air speed, wing flaps position, glide slope deviation from reference, localizer deviation (measured by "dots"), speed brake deflection, and vertical speed (of descent), expressed in units of time and in units of altitude above local terrain (or touchdown) An inset table at the left indicates nominal or reference values for each of these parameters.

Figure 10:
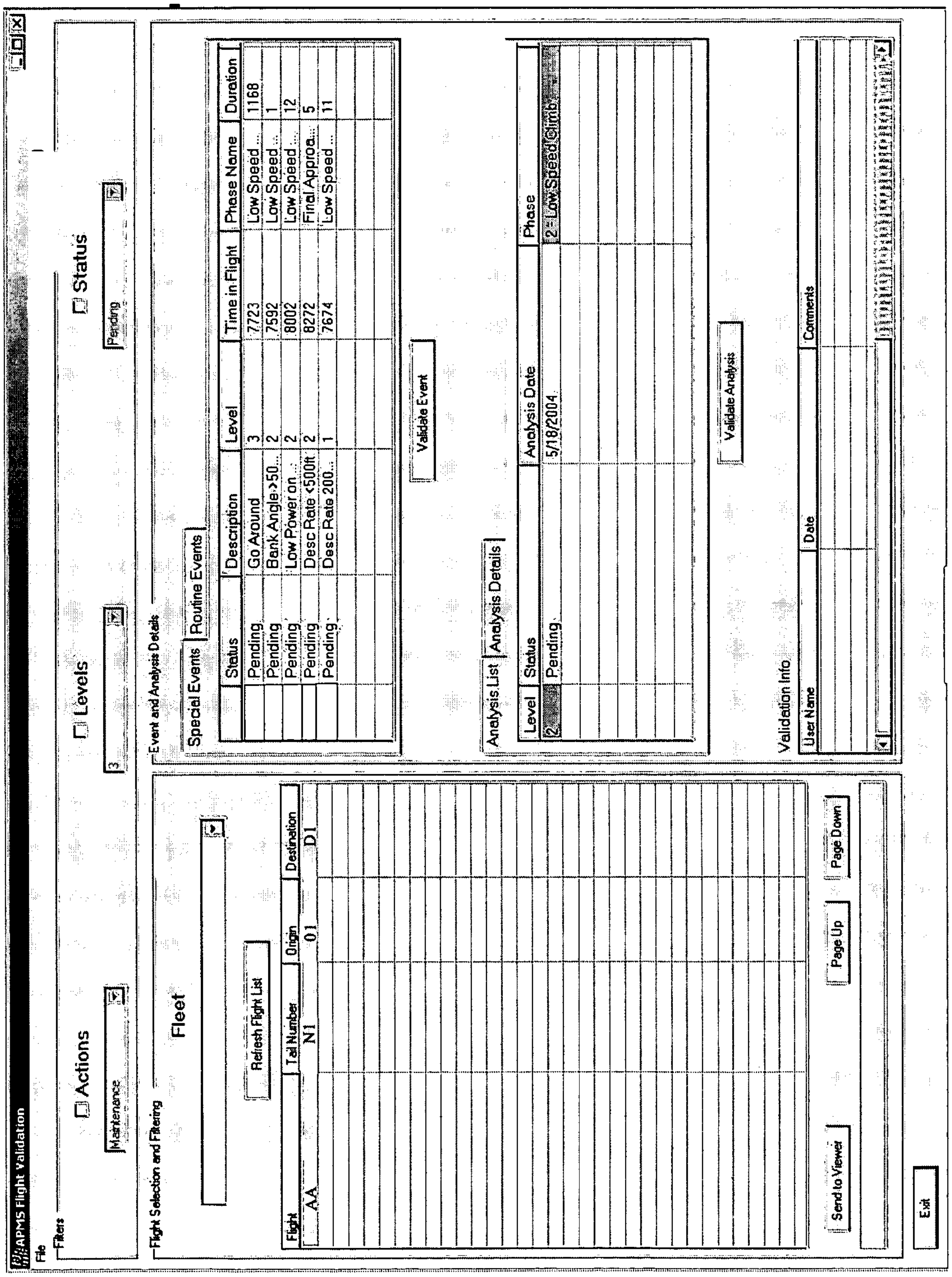
FIG. 10 sets forth observed aircraft responses to development of exceedences and atypicalities in a specified class.

FIG. 10 illustrates a display allowing an analyst to determine whether any exceedences also occurred on an atypical flight, and what action, if any, was taken in response to observation of the exceedence. Where an exceedence occurred, the display includes a phase and time when the excedence began and the duration of the exceeedence. In the example illustrated, a flight phase, found to be atypical due to presence of a high energy during the arrival, was found to have an exceedence preceding a flight go-around. In attempting to bring the high energy situation under control, the flight exceeded the desired descent rate (for 11 secs), had a below-standard engine power setting (12 secs) and used an excessive bank angle (1 sec), then initiated a go-around (requiring 1168 secs to complete) to attempt a second approach. During this second approach, a high descent rate occurred briefly (5 secs) below 500 feet.

FIG. 11 illustrates a display of relevant weather data, taken from a linked weather information report (METAR or other), that were present at a specified airport (Dallas-Fort Worth) at or around a specified date and time. These data may be displayed and examined briefly to determine if one or more weather variables are likely to have contributed to an exceedence or to an atypical phase of a specified flight. The relevant data include, but are not limited to, visibility, temperature, dewpoint, wind direction, average wind speed, maximum wind gust speed, altimeter reading (relevant to determine local air density), and sky condition.

What is claimed is:

1. A method for displaying information for one or more aircraft flights, the method comprising:

for at least one continuously time varying parameter associated with at least one flight phase of each of M aircraft, numbered m=1, . . . , M (M≧2), providing a polynomial approximation P(t;m) for the parameter as a polynomial of degree D in a time variable t in a selected time interval for the selected flight phase, where D is at mosr equal to 2;

expressing the polynomial P(t;m) as $p0(m)+p1(m)(t-t0)+p2(m)(t-t0)^2+error(m)$, where p0(m), p1(m), p2(m) and error(m) are coefficients associated with the flight phase and with aircraft number m and error(m) is minimized by choice of the coefficients p0(m), p1(m) and p2(m);

for each set of coefficient values $\{p1(m),pk2(m),pk3(m)),error(m)\}_m$, determining a mean value p(k;1), a variance p(k;2), a minimum value and a maximum value for each of the sets of coefficient values;

for each of the M aircraft flights, providing a list of flights that manifest atypical behavior according to one or more specified atypicality criteria, from a comparison with a set of one or more reference values of at least one of the mean, variance, minimum value and maximum value for at least one of the sets of coefficient values;

for at least one atypical phase of the at least one flight in the collection, displaying, in at least one of graphical format and alphanumeric format, variation, with at least one of time or distance traveled, of a selected flight parameter (referred to as an “atypical phase flight parameter”) that contributed to the atypical phase for the at least one flight, and displaying, on the same screen, variation of a selected group of flight parameter values, corresponding to the selected atypical phase flight parameter, for flights that were not atypical during the atypical phase; and graphically displaying variation, with at least one of time and distance traveled, of a flight parameter trace for each of one or more atypical phase flight parameters.

2. The method of claim 1, further comprising displaying a fraction representing number of flights for which said selected flight parameter is atypical for said at least one atypical phase.

3. The method of claim 1, further comprising displaying, for said atypical phase, each of said flight parameters that contributed to said at least one atypical phase of said at least one flight.

4. The method of claim 1, further comprising indicating, in alphanumeric format, why said at least one atypical phase flight parameter for said at least one flight is atypical, as compared with a phase flight parameter for the same phase for said flights that were not atypical during said atypical phase.

5. The method of claim 1, further comprising including in said K flight phases at least one of the phases pre-takeoff taxi, pre-takeoff position, takeoff, low altitude ascent, high altitude ascent, cruise, high altitude descent, low altitude descent, runway approach, touchdown, and post-touchdown taxi.

6. The method of claim 1, further comprising using said comparison of at least one of the mean, variance, minimum value and maximum value for at least one of the sets of coefficient values for at least two different flight phase parameters to determine if said flight phase is atypical.

7. A system for displaying information for one or more aircraft flights, the system comprising a computer and visually perceptible display that are programmed:

for at least one continuously time varying parameter associated with at least one flight phase of each of M aircraft, numbered m=1 . . . , M (M≧2), to provide a polynomial approximation P(t;m) for the parameter as a polynomial of degree D in a time variable t in a selected time interval for the selected flight phase, where D is at most equal to 2;

to express the polynomial P(t;m) as $p0(m)+p1(m)(t-t0)+p2(m)(t-t0)^2+error(m)$, where p0(m), p1(m), p2(m) and error(m) are coefficients associated with the flight phase and with aircraft number m and error(m) is minimized by choice of the coefficients p0(m), p1(m) and p2(m);

for each set of coefficient values $\{p1(m),pk2(m),pk3(m)),error(m)\}_m$, to determine a mean value p(k;1), a variance p(k;2), a minimum value and a maximum value for each of the sets of coefficient values;

for each of the M aircraft flights, to provide a list of flights that manifest atypical behavior according to one or more specified atypicality criteria, from a comparison with a set of one or more reference values of at least one of the mean, variance, minimum value and maximum value for at least one of the sets of coefficient values;

for at least one atypical phase of the at least one flight in the collection, to display, in at least one of graphical format and alphanumeric format, variation, with at least one of time or distance traveled, of a selected flight parameter (referred to as an “atypical phase flight parameter”) that contributed to the atypical phase for the at least one flight, and to display, on the same screen, variation of a selected group of flight parameter values, corresponding to the selected atypical phase flight parameter, for flights that were not atypical during the atypical phase; and to graphically display variation, with at least one of time or distance traveled, of a flight parameter trace for each of one or more atypical phase flight parameters.

8. The system of claim 7, wherein said computer and display are further programmed to display a fraction representing number of flights for which said selected flight parameter is atypical for said at least one atypical phase.

9. The system of claim 7, wherein said computer and display are further programmed to display, for said at least one atypical phase, each of said flight parameters that contributed to said atypical phase of said at least one flight.

10. The system of claim 7, wherein said computer and display are further programmed to indicate, in alphanumeric format, why said at least one atypical phase flight parameter for said at least one flight is atypical, as compared with a phase flight parameter for the same phase for said flights that were not atypical during said atypical phase.

11. The system of claim 7, wherein said K flight phases include at least one of the phases pre-takeoff taxi, pre-takeoff position, takeoff, low altitude ascent, high altitude ascent, cruise, high altitude descent, low altitude descent, runway approach, touchdown, and post-touchdown taxi.

12. The system of claim 7, wherein said computer is further programmed to use said comparison of at least one of the mean, variance, minimum value and maximum value for at least one of the sets of coefficient values for at least two different flight phase parameters to determine if said flight phase is atypical.

* * * * *